United States Patent [19]
Evans

[11] 3,829,245
[45] Aug. 13, 1974

[54] GAS WELL EQUIPMENT
[76] Inventor: O. T. Evans, P.O. Box 47, Beech Grove, Ky. 42322
[22] Filed: Aug. 22, 1973
[21] Appl. No.: 390,621

[52] U.S. Cl. .............................. 417/108, 166/311
[51] Int. Cl. ........................ F04f 1/18, E21b 21/00
[58] Field of Search ......... 417/108, 54, 55; 166/311

[56] References Cited
UNITED STATES PATENTS

| | | | |
|---|---|---|---|
| 1,153,253 | 9/1905 | Purdy | 417/108 |
| 1,605,174 | 11/1926 | Craig et al. | 417/108 X |
| 1,609,887 | 12/1926 | Russell | 417/108 |
| 2,077,912 | 4/1937 | Voorhis | 417/108 X |

*Primary Examiner*—William L. Freeh
*Assistant Examiner*—Richard E. Gluck

[57] ABSTRACT

A purge pipeline for use in purging a natural gas productive formation of water is characterized, such as through including fittings, by having in the wall thereof at each of a plurality of locations spaced apart from one another longitudinally of the pipeline, a pair of first and second localized wall portions opposing one another across the interior of the pipeline, the localized wall portions being relatively erosion resistant as compared with adjacent regions of the pipeline, the first localized wall portions having apertures therein directed into the interior of the pipeline toward the second localized wall portions in the pairs for natural gas supplied under pressure from a natural gas productive formation and entering the apertures to produce jets impinging upon the second localized wall portion within the pipeline and have the gas delivered in the jets promote flow of water through the pipeline from the natural gas productive formation. Fittings for purge pipelines to be so characterized are also provided.

10 Claims, 4 Drawing Figures

PATENTED AUG 13 1974
3,829,245
Fig. 1
Fig. 2
Fig. 3
Fig. 4
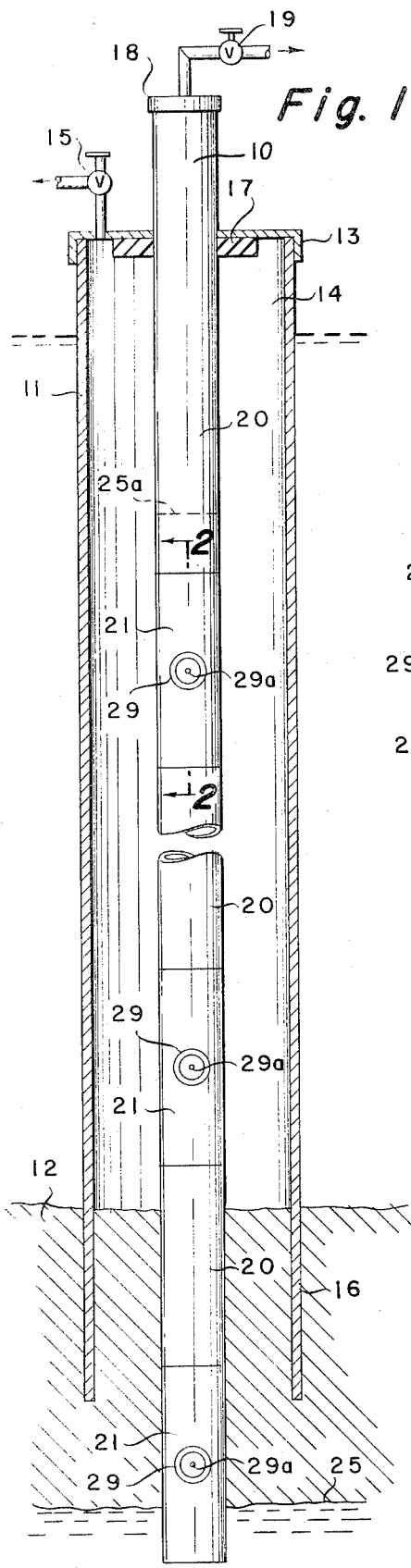
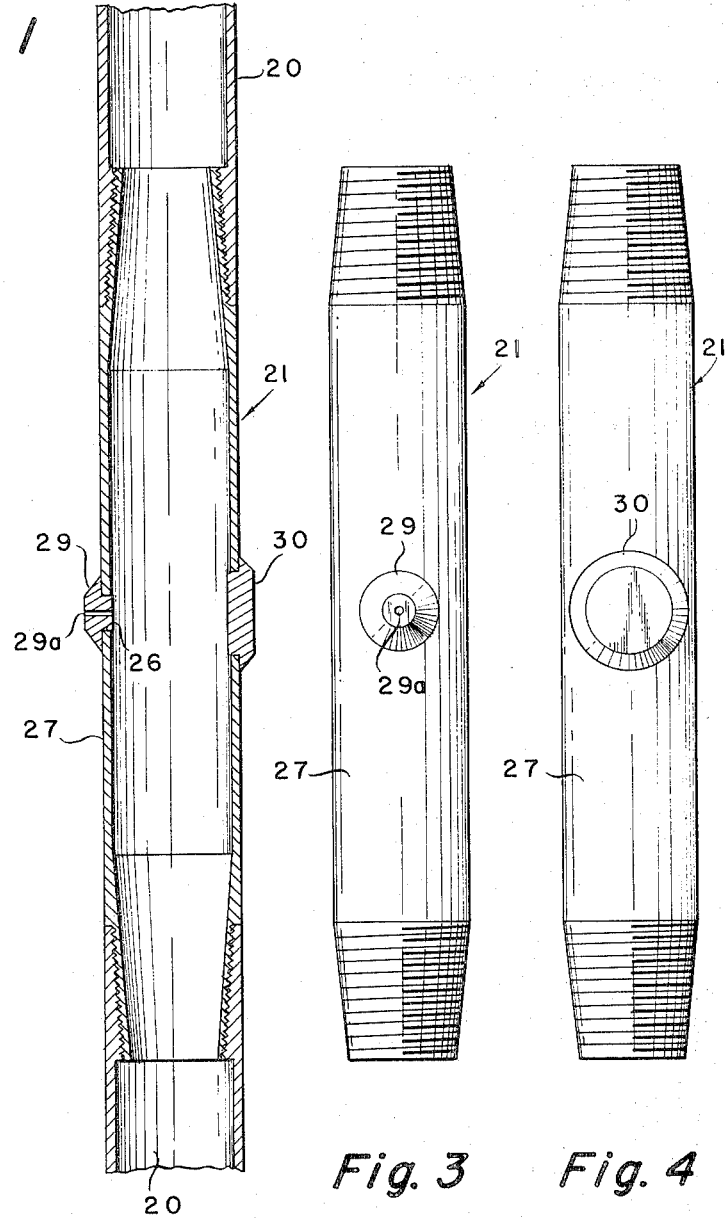

GAS WELL EQUIPMENT

The present invention relates to gas wells and to gas well equipment and is more particularly concerned with purge pipeline for use in taking off incidental water from a natural productive formation which affords a supply of natural gas to a well.

An object of this invention is the provision of a pipeline which is effective and highly satisfactorily durable for conducting water from a natural gas productive formation in the earth, and through a well, having the flow of water induced through the pipeline by a supply of natural gas from the well and jetted in the pipeline at high velocity transversely of the pipeline.

Another object herein is that of providing a gas jetting pipeline component which remarkably withstands use over long periods of time while inducing flow of water in the pipeline from a natural gas productive formation toward a water outlet from the related gas well by natural gas jetted into the component at high velocity transversely of the pipeline.

Another object herein is to provide for affiliating with a natural gas productive formation a water purge pipeline including therein a number of gas jetting components of the character indicated for establishing flow of water from the gas productive formation through the pipeline and thereafter out of the well.

Other objects of this invention in part will be obvious and in part pointed out more fully hereinafter.

As conducive to a clearer understanding of certain features of the present invention it is noted at this point that formations in the earth which are laden with natural gas under considerable pressure usually also contain water which is regarded as being a deleterious substance desirably to be removed from the gas before the main quantities of the gas are taken from the well. In accordance with usual practice, a well casing is put down to the gas productive formation in drilling the well, the lower end of the casing thereafter being sealed externally to the drilled earth as by grouting, and the upper end of the casing being capped off and placed in communication with a main gas supply outlet valve. A water purge pipeline is lowered through and sealed to the cap on the main casing, and is quite small in outside diameter as compared with the inside diameter of the casing. The water purge pipeline usually extends downward into the well far enough to lead considerably lower into the gas productive formation than does the casing so that water can be admitted into the lower end of the purge pipeline from the formation. The purge pipeline is connected outside the cap on the main casing with a water outlet valve which is opened when water is to be fed from the well, this usually with having the main gas supply outlet valve from the well closed. Thereafter, the water outlet valve is closed, which usually is followed by opening the main gas outlet supply valve and relatively dry gas is fed off through that valve.

In accordance with the present invention, water purge pipeline structure and components provided for use in water purge pipelines enable the pipelines durably and effectively to serve not only as conduits for conducting water from gas productive formations in the related gas wells but enable delivery of a jet of gas transversely of the water purge pipeline using a small portion of the gas derived for that purpose from the related well to promote flow of water from the gas productive formation toward the water purge pipeline outlet from the well.

The purge pipelines and components thereof provided herein alleviate problems having to do with erosion in critical regions of the pipeline where the jet effect of high velocity gas for promoting water flow in the pipline is encountered, and accordingly a gas well which is characterized by an installation of structure in accordance with the present invention may function longer effectively without there being any need for shutdown and replacement of the water purge pipeline or components thereof due to erosion such as that caused by sand or other solids entrained in the small portion of the gas used from the well for promoting flow of water through the purge pipeline from the gas productive formation.

In the accompanying drawings relating to a preferred embodiment of the present invention:

FIG. 1 represents a water purge pipeline structure having that structure installed in a gas well;

FIG. 2 is an enlarged longitudinal axial sectional detail of one of the gas jet water purge components, and adjacent broken away portions of the adjacent water pipeline sections, taken at II—II in FIG. 1;

FIG. 3 is an elevational representation of the component in FIG. 2 as viewed toward the gas jet inlet face of the component; and FIG. 4 is an elevational representation of the component in FIG. 3, but as seen from a 180° opposite point of vantage as compared with the showing in the latter figure.

Referring now more particularly to FIG. 1 of the drawings, a purge pipeline designated in general by the reference numeral 10 is provided in association with a well casing 11 which leads downwardly from the surface of the earth into a natural gas productive formation 12 containing natural gas and incidental water both under pressure. A cap 13 secured to the upper end of casing 11 closes off the latter end of the casing, and a main gas outlet valve 15 is connected on input side through an aperture in cap 13 so as to communicate with space 14 which is filled with natural gas under pressure on supply from the gas productive formation 12 and when valve 15 is opened gas under pressure can issue through this valve from the well. At lower end, the well casing 11 is sealed along the exterior face to the well bore as by cement or grouting 16 thus to prevent the escape of gas between the casing and well bore from the gas productive formation 12.

Purge pipeline 10 leads downward into the casing 11 through an aperture in the cap 13 and through an annular elastic seal 17 which is mounted on the cap and seals off the cap to the purge pipeline. At upper end, outside the cap 13, the purge pipeline 10 is itself closed off by means of a cap 18, and the interior of the purge pipeline is connected through an aperture in the latter cap with a water outlet valve 19. Further, in the embodiment shown, the purge pipeline 10 comprises a plurality of pipe sections 20 which are connected in series fluid conducting relation with a plurality of longitudinally axially hollow fittings 21, the fittings being spaced apart from one another longitudinally of the purge pipeline 10 having the lower end of the purge pipeline 10 immersed below water level 25 in the gas productive formation 12 and to have gas under the pressure existing in this formation cause water to rise in purge pipeline 10 to a level such as 25a from which the water in this pipeline is to be caused to continue to flow through the outlet valve 19 when the gas productive formation 12 is being purged of water.

Turning now more particularly to features of the pipeline fittings 21 in the purge pipeline 10, an understanding of structure of these fittings can be had through referring to one such fitting represented in FIGS. 2, 3 and 4, for all of the fittings 21 in the present embodiment are similar. Thus, fitting 21 has a longitudinally cylindrically hollow body such as of steel and the body internally adjacent to opposite longitudinal ends thereof is threaded for connection such as with adjacent threaded ends of the purge pipeline sections 20, also for example, of steel, are such as with the threaded end of one pipeline section 20 so as to be terminally on the purge pipeline 10 below water level 25 in the gas productive formation 12. Externally, the wall 27 forming the main body of the fitting 21 is substantially cylindrical coaxially with the interior substantially cylindrical face of this same body wall. Fitting 21 further includes appurtenant to the body wall 27 thereof a first localized wall portion 29 and a second localized wall portion 30 opposing one another diametrically across the fitting and both located intermediately of the internally threaded opposite longitudinal ends of the fitting. The first and second localized wall portions are relatively erosion resistant as compared with body wall 27 of the fitting and advantageously are made of metal carbide, preferably tungsten carbide. First localized wall portion 29 has an aperture 29a generally centrally therein directed into the interior of the fitting laterally of the fitting toward the second localized wall portion 30 for natural gas supplied under pressure from a natural gas productive formation 12 in the manner of FIG. 1 and entering the aperture 29a from the exterior of the fitting to produce a gas jet impinging upon the second localized wall portion 30 inside the fitting. In accordance with practice perferred, a preformed first localized wall portion 29 is produced as a pressed and sintered insert of tungsten carbide powder having aperture 29a in the insert accordingly produced. The insert thereafter is applied within a corresponding opening 26 in the body wall 27 such as by welding. Second localized wall portion 30 in being provided as preferred is introduced as a tungsten carbide weld deposit in a corresponding opening in the body wall 27 so as to fill the latter opening and bond to the body wall at the rim of that opening under the heat of the deposit. The localized first and second localized portions 29 and 30, as provided, advantageously are shaped inwardly beyond the substantially cylindrical inner face of body wall 27, accordingly to keep the purge pipeline 10 free of introducing physical obstructions which otherwise could interfere with a sometimes desired supplemental use of the purge pipeline 10 to accommodate lowering and raising of instruments in the well by cable or the like.

With purge pipeline 10 including an adequate member of the gas inlet fittings 21, which number varies with such factors as depth of the well and natural pressure of the gas in the well, and by appropriately situating the fittings along the pipeline, gas under pressure from the well enters the apertures 29a in the fittings 21 and jets at high velocity into the pipeline when the main gas outlet valve 15 is closed and the pipeline valve 19 is open. The gas pressure in the well tends to raise water in the pipeline, as for example, to level 25a; however, the water in progressing up the pipeline is dispersed through encountering the high velocity jets of gas issuing into the pipeline from the apertures 29a in the fittings, and meanwhile gas entering the lower end of the pipeline and passing upwardly under pressure of the well transports the water in the pipeline through the open valve 19.

The pairs of first and second localized wall portions 29 and 30 in the gas inlet fittings 21 in the purge pipeline 10 importantly contribute longevity to the purge pipeline and accordingly greatly diminish problems having to do with shut down of operation of the well for replacement of parts. Such advantages as those appurtenant to durability of the purge pipeline are successfully obtained in view of the high resistance to erosion offered by the first and second localized wall portions 29 and 30 in their positions relative to one another in the pairs thereof in the purge pipeline. Remarkable durability of the purge pipeline 10 is had despite the jets of high velocity gas received in the pipeline, considering, too, that the gas entering the fittings and contained in the jets is likely to entrain solids.

As many possible embodiments of this invention may be made and as many possible changes may be made in the embodiment hereinbefore set forth, it will be distinctly understood that all matter described herein is to be interpreted as illustrative and not as a limitation.

I claim:

1. In a purge pipeline for a natural gas productive formation containing natural gas and incidental water both pressurized in a well wherein a casing encloses said pipeline and said pipeline communicates with said pressurized water in said natural gas productive formation and said casing communicates with said natural gas productive formation and contains natural gas under pressure from said formation, the improvement which includes said purge pipeline having in the wall thereof at each of a plurality of locations spaced apart from one another longitudinally of said pipeline a pair of first and second localized wall portions opposing one another across the interior of said pipeline, said localized wall portions being relatively erosion resistant as compared with adjacent regions of said pipeline, and said first localized wall portions having apertures therein directed into the interior of said pipeline laterally of said pipeline toward said second localized wall portions in said pairs for natural gas supplied under pressure from a water-containing natural gas productive formation and entering said apertures from outside said pipeline to produce jets impinging upon said second localized wall portions within said pipeline and have the gas delivered in said jets promote flow of water through said pipeline from said natural gas productive formation.

2. In a purge pipeline as set forth in claim 1 wherein said pipeline includes pipeline sections and fittings connected with said pipeline sections, and said pairs of first and second localized wall portions are localized portions of said fittings and oppose one another in said fitting in said pair.

3. In a purge pipeline as set forth in claim 1 wherein said localized wall portions are localized metal carbide wall portions.

4. In a purge pipeline as set forth in claim 1 wherein said localized wall portions are localized tungsten carbide wall portions.

5. In a gas injection fitting for use in a purge pipeline in a natural gas productive formation containing natural gas and incidental water both pressurized in a well wherein a casing encloses said pipeline and said pipeline communicates with said pressurized water in said natural gas productive formation and said casing communicates with said natural gas productive formation and contains natural gas under pressure from said formation, the improvement which includes said fitting having in the wall thereof first and second localized wall portions opposing one another across the interior of said fitting, said localized wall portions being relatively erosion resistant as compared with the body of said fitting, and said first localized wall portion having an aperture therein directed into the interior of said fitting laterally of said fitting toward said second localized wall portion for natural gas supplied under pressure from a water-containing natural gas productive formation and entering said aperture from the exterior of said fitting to produce a jet impinging upon said second localized wall portion.

6. In a gas injection fitting as set forth in claim 5 wherein said body internally is threaded adjacent to opposite longitudinal ends thereof for connection.

7. In a gas injection fitting as set forth in claim 5 wherein said localized wall portions are localized metal carbide wall portions secured to said body.

8. In a gas injection fitting as set forth in claim 5 wherein said first localized wall portion includes a sintered metal carbide insert wherein said aperture is provided, said insert being secured to said body, and said second localized wall portion includes a metal carbide weld deposit bonded to said body.

9. In a gas injection fitting as set forth in claim 5 wherein said localized wall portions are localized tungsten carbide wall portions secured to said body.

10. In a gas injection fitting as set forth in claim 5 wherein said fitting internally is threaded in said body thereof adjacent to opposite longitudinal ends of said body for connection, said first localized wall portion includes a sintered tungsten carbide insert wherein said aperture is provided, said insert being secured to said body, and said second localized wall portion includes a tungsten carbide weld deposit bonded to said body.

* * * * *